United States Patent
Kwon et al.

(10) Patent No.: US 10,165,636 B2
(45) Date of Patent: Dec. 25, 2018

(54) DISPLAY DEVICE

(71) Applicant: Samsung Display Co., Ltd., Yongin-si, Gyeonggi-do (KR)

(72) Inventors: Youngsup Kwon, Gwangmyeong-si (KR); Mingyu Kim, Asan-si (KR); Byungkyou Min, Seoul (KR); Jinwon Jang, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 13 days.

(21) Appl. No.: 15/213,270

(22) Filed: Jul. 18, 2016

(65) Prior Publication Data

US 2017/0094737 A1    Mar. 30, 2017

(30) Foreign Application Priority Data

Sep. 25, 2015  (KR) .................. 10-2015-0136013

(51) Int. Cl.
*H05B 37/02* (2006.01)
*H05B 33/08* (2006.01)
*G02F 1/1335* (2006.01)

(52) U.S. Cl.
CPC ... *H05B 33/0827* (2013.01); *G02F 1/133603* (2013.01); *H05B 33/0812* (2013.01); *G02F 2001/133612* (2013.01)

(58) Field of Classification Search
CPC ............ H05B 33/0812; H05B 33/0827; H05B 33/0836; H05B 33/0839; H05B 33/0845; G02F 1/133603; G02F 2011/133612
USPC ...................... 315/185 R, 307, 312
See application file for complete search history.

(56) References Cited

U.S. PATENT DOCUMENTS

| | | | |
|---|---|---|---|
| 7,391,407 B2 | 6/2008 | Kim | |
| 7,652,655 B2 | 1/2010 | Kim | |
| 2005/0264471 A1* | 12/2005 | Yamazaki | G06F 3/1446 345/1.1 |
| 2007/0152606 A1* | 7/2007 | Wey | H05B 33/0809 315/274 |
| 2009/0109371 A1* | 4/2009 | Mitamura | G02B 6/0076 349/62 |
| 2010/0123741 A1 | 5/2010 | Shin et al. | |
| 2012/0235891 A1* | 9/2012 | Nishitani | G02B 3/0056 345/102 |

(Continued)

FOREIGN PATENT DOCUMENTS

| | | |
|---|---|---|
| JP | 2013-26024 A | 2/2013 |
| JP | 2014-50112 A | 3/2014 |

(Continued)

*Primary Examiner* — Tung X Le
(74) *Attorney, Agent, or Firm* — Lewis Roca Rothgerber Christie LLP (57) ABSTRACT

A display device is disclosed. In one aspect, the display device includes a display panel including a first display panel and a second display panel. The display device also includes a first light source unit disposed to correspond to the first display panel, a second light source unit disposed to correspond to the second display panel, a direct current (DC)-DC converter configured to receive a driving power and generate a first light source driving voltage configured to drive the first light source unit, and a regulator configured to receive the driving power and generate a second light source driving voltage configured to drive the second light source unit.

21 Claims, 6 Drawing Sheets

(56) References Cited

U.S. PATENT DOCUMENTS

| | | | |
|---|---|---|---|
| 2012/0274877 A1* | 11/2012 | Sasaki | G09G 3/3406 349/69 |
| 2013/0113841 A1 | 5/2013 | Choi et al. | |
| 2013/0293208 A1 | 11/2013 | D'Angelo et al. | |
| 2014/0152721 A1* | 6/2014 | Byun | G09G 3/3208 345/691 |
| 2014/0176618 A1 | 6/2014 | Lee | |
| 2015/0061528 A1 | 3/2015 | Raval et al. | |
| 2015/0115818 A1* | 4/2015 | Shiu | H05B 33/089 315/193 |
| 2015/0242049 A1* | 8/2015 | Tsukahara | G06F 3/0488 345/173 |
| 2016/0143095 A1* | 5/2016 | Lee | H05B 33/083 315/122 |

FOREIGN PATENT DOCUMENTS

| | | |
|---|---|---|
| KR | 10-2005-0051071 A | 6/2005 |
| KR | 10-2006-0093604 A | 8/2006 |
| KR | 10-2010-0055700 A | 5/2010 |
| KR | 10-2012-0078999 A | 7/2012 |

* cited by examiner

DISPLAY DEVICE

CROSS-REFERENCE TO RELATED APPLICATION

This application claims the priority to and all the benefits accruing under 35 U.S.C. § 119 of Korean Patent Application No. 10-2015-0136013, filed on Sep. 25, 2015, with the Korean Intellectual Property Office (KIPO), the disclosure of which is incorporated herein in its entirety by reference.

BACKGROUND

Field

The described technology generally relates to a display device.

Description of the Related Technology

With the advancement of information technology, products based on the Internet of things (IoT) are being widely developed.

A liquid crystal display ("LCD") includes a main display panel and an auxiliary display panel having different sizes.

In general, the auxiliary display panel has a significantly smaller area than that of the main display panel, and thus, the number of light sources embedded in the auxiliary display panel is less than the number of light sources embedded in the main display panel. Accordingly, in configurations where the primary light source and the auxiliary light source are connected in parallel, the primary light source has a greater load than that of the auxiliary light source, and thus, a magnitude of a light-source driving voltage is determined based on the primary light source.

However, in this case, a significantly high voltage is applied to the auxiliary light source, such that a high voltage is applied to a static current switching element that is connected to the auxiliary light source. Thus, a large amount of heat is generated from the static current switching element and power consumption increases.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF CERTAIN INVENTIVE ASPECTS

One inventive aspect relates to a display device that can reduce power consumption and the amount of heat generation of a static current switching element.

Another aspect is a display device that can reduce power consumption and the amount of heat generation of static current switching elements connected to light source strings each having different levels of loads.

Another aspect is a display device that includes: a display panel including a first display panel and a second display panel; a first light source unit disposed to correspond to the first display panel; a second light source unit disposed to correspond to the second display panel; a direct current ("DC")-DC converting unit configured to receive a driving power and generate a first light source driving voltage required to drive the first light source unit; and a regulator configured to receive the driving power and generate a second light source driving voltage required to drive the second light source unit.

Each of the first light source unit and the second light source unit can include a plurality of light sources.

The number of light sources included in the second light source unit and connected to one another in series can be less than the number of light sources included in the first light source unit and connected to one another in series.

The second light source driving voltage can be lower than the first light source driving voltage.

A voltage across opposite ends of the second light source unit can be lower than a voltage across opposite ends of the first light source unit.

The regulator can be a linear regulator or a low-dropout ("LDO") regulator.

The display device can further include: a light source driving unit configured to generate current control signals corresponding to the first light source unit and the second light source unit; a first detecting node connected to the light source driving unit; a first static current switching element controlled by the light source driving unit and connected between the first light source unit and the first detecting node; and a first detecting resistor connected between the first detecting node and ground.

The display device can further include: a light source driving unit configured to generate current control signals corresponding to the first light source unit and the second light source unit; a second detecting node connected to the light source driving unit; a second static current switching element controlled by the light source driving unit and connected between the second light source unit and the second detecting node; and a second detecting resistor connected between the second detecting node and ground.

The display device can further include a power unit configured to output the driving power.

The display device can further include a light source driving unit configured to receive an output voltage from the regulator and control the DC-DC converting unit.

The output voltage can be the same as the second light source driving voltage.

Another aspect is a display device that includes: a display panel including a first display panel and a second display panel; a first light source unit disposed to correspond to the first display panel; a second light source unit disposed to correspond to the second display panel; a first DC-DC converting unit configured to receive a first driving power and generate a panel driving voltage required to drive the display panel; and a second DC-DC converting unit configured to receive a second driving power and generate a first light source driving voltage required to drive the first light source unit. The second light source unit can receive the first driving power as a second light source driving voltage to drive the second light source unit.

Each of the first light source unit and the second light source unit can include a plurality of light sources.

The number of light sources included in the second light source unit and connected to one another in series can be less than the number of light sources included in the first light source unit and connected to one another in series.

The first driving power can be lower than the second driving power.

A voltage across opposite ends of the second light source unit can be lower than a voltage across opposite ends of the first light source unit.

The display device can further include a circuit board configured to receive the second driving power to transmit the second driving power to the second light source unit.

The display device can further include: a light source driving unit configured to generate current control signals corresponding to the first light source unit and the second light source unit; a first detecting node connected to the light source driving unit; a first static current switching element controlled by the light source driving unit and connected between the first light source unit and the first detecting node; and a first detecting resistor connected between the first detecting node and ground.

The display device can further include: a light source driving unit configured to generate current control signals corresponding to the first light source unit and the second light source unit; a second detecting node connected to the light source driving unit; a second static current switching element controlled by the light source driving unit and connected between the second light source unit and the second detecting node; and a second detecting resistor connected between the second detecting node and ground.

The display device can further include a power unit configured to generate the first driving power and the second driving power.

Another aspect is a display device comprising: a display panel comprising a first display panel and a second display panel adjacent to the first display panel; a first light source unit configured to provide light to the first display panel; a second light source unit configured to provide light to the second display panel; a direct current (DC)-DC converter configured to receive a driving power and generate a first light source driving voltage configured to drive the first light source unit; and a regulator configured to receive the driving power and generate a second light source driving voltage configured to drive the second light source unit.

In the above display device, each of the first and second light source units comprises a plurality of light sources.

In the above display device, the number of light sources included in the second light source unit and connected to one another in series is less than the number of light sources included in the first light source unit and connected to one another in series.

In the above display device, the second light source driving voltage is lower than the first light source driving voltage.

In the above display device, a voltage across the second light source unit is lower than a voltage across the first light source unit.

In the above display device, the regulator includes a linear regulator or a low-dropout (LDO) regulator.

The above display device further comprises: a light source driving unit configured to generate a plurality of current control signals to control the first and second light source units; a first detecting node connected to the light source driving unit; a first static current switching element connected between the first light source unit and the first detecting node, wherein the light source driving unit is configured to control the first static current switching element; and a first detecting resistor connected between the first detecting node and a ground voltage.

The above display device further comprises: a light source driving unit configured to generate a plurality of current control signals to control the first and second light source units; a second detecting node connected to the light source driving unit; a second static current switching element connected between the second light source unit and the second detecting node, wherein the light source driving unit is configured to control the second static current switching element; and a second detecting resistor connected between the second detecting node and a ground voltage.

The above display device further comprises a power unit configured to output the driving power.

The above display device further comprises a light source driving unit configured to receive an output voltage from the regulator and control the DC-DC converter.

In the above display device, the output voltage and the second light source driving voltage are the same.

Another aspect is a display device comprising: a display panel comprising a first display panel and a second display panel adjacent to the first display panel; a first light source unit configured to provide light to the first display panel; a second light source unit configured to provide light to the second display panel; a first DC-DC converter configured to receive a first driving power and generate a panel driving voltage configured to drive the display panel; and a second DC-DC converter configured to receive a second driving power and generate a first light source driving voltage configured to drive the first light source unit, wherein the second light source unit is configured to receive the first driving power as a second light source driving voltage to drive the second light source unit.

In the above display device, each of the first and second light source units comprises a plurality of light sources.

In the above display device, the number of light sources included in the second light source unit and connected to one another in series is less than the number of light sources included in the first light source unit and connected to one another in series.

In the above display device, the first driving power is lower than the second driving power.

In the above display device, a voltage across the second light source unit is lower than a voltage across the first light source unit.

The above display device further comprises a circuit board configured to receive the second driving power to transfer the second driving power to the second light source unit.

The above display device further comprises: a light source driving unit configured to generate a plurality of current control signals to control the first and second light source units; a first detecting node connected to the light source driving unit; a first static current switching element connected between the first light source unit and the first detecting node, wherein the light source driving unit is configured to control the first static current switching element; and a first detecting resistor connected between the first detecting node and a ground voltage.

The above display device further comprises: a light source driving unit configured to generate a plurality of current control signals to control the first and second light source units; a second detecting node connected to the light source driving unit; a second static current switching element connected between the second light source unit and the second detecting node, wherein the light source driving unit is configured to control the second static current switching element; and a second detecting resistor connected between the second detecting node and a ground voltage.

The above display device further comprises a power unit configured to generate the first and second driving powers.

DETAILED DESCRIPTION OF CERTAIN INVENTIVE EMBODIMENTS

Advantages and features of the described technology and methods for achieving them will be made clear from exemplary embodiments described below in detail with reference to the accompanying drawings. The present invention can, however, be embodied in many different forms and should not be construed as being limited to the exemplary embodiments set forth herein. Rather, these exemplary embodiments are provided so that this disclosure will be thorough and complete, and will fully convey the scope of the described technology to those skilled in the art. The described technology is merely defined by the scope of the claims. Therefore, well-known constituent elements, operations and techniques are not described in detail in the exemplary embodiments in order to prevent the described technology from being obscurely interpreted. Like reference numerals refer to like elements throughout the specification.

In the drawings, thicknesses of a plurality of layers and areas are illustrated in an enlarged manner for clarity and ease of description thereof. Further when a layer, area, or plate is referred to as being "below" another layer, area, or plate, it can be directly below the other layer, area, or plate, or intervening layers, areas, or plates can be present therebetween. Conversely, when a layer, area, or plate is referred to as being "directly below" another layer, area, or plate, intervening layers, areas, or plates can be absent therebetween.

The spatially relative terms "below", "beneath", "less", "above", "upper", and the like, can be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device can be placed "above" another device. Accordingly, the illustrative term "below" can include both the lower and upper positions. The device can also be oriented in the other direction, and thus the spatially relative terms can be interpreted differently depending on the orientations.

It will be understood that, although the terms "first," "second," "third," and the like can be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which the described technology pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification. In this disclosure, the term "substantially" includes the meanings of completely, almost completely or to any significant degree under some applications and in accordance with those skilled in the art. Moreover, "formed, disposed or positioned over" can also mean "formed, disposed or positioned on." The term "connected" includes an electrical connection.

Hereinafter, a display device 100 according to an exemplary embodiment is described in detail with reference to FIGS. 1 to 6.

Figure 1:
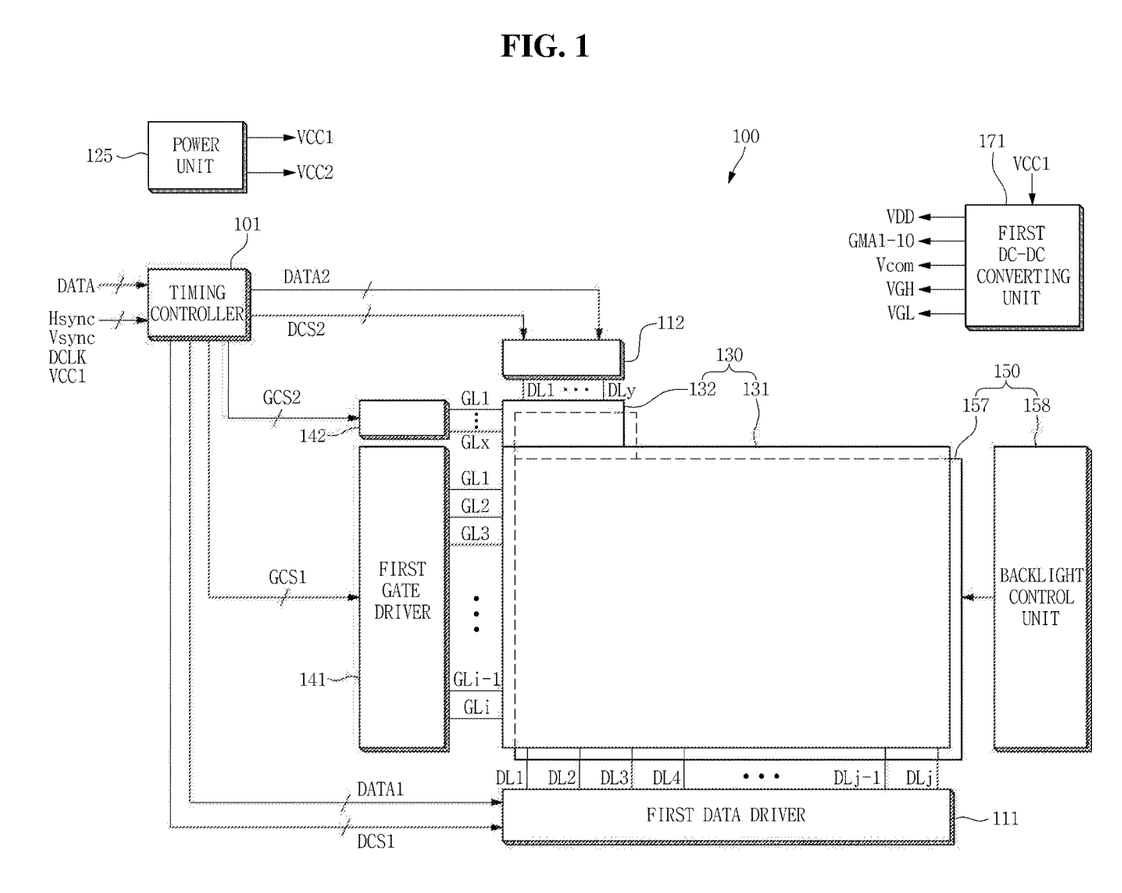
FIG. 1 is a block diagram illustrating a display device according to an exemplary embodiment.
Figure 2:
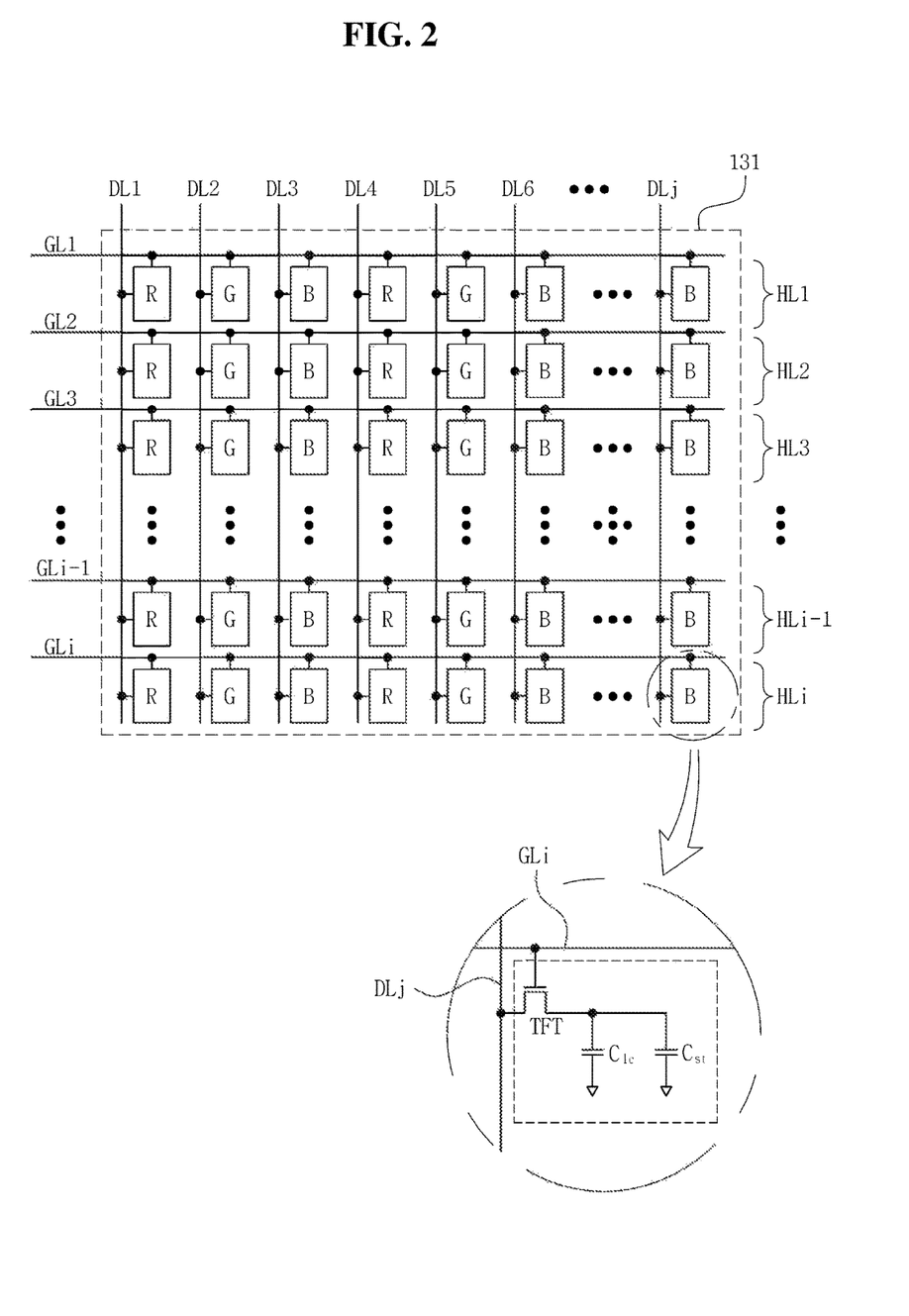
FIG. 2 is a detailed configuration view illustrating a first display panel illustrated in FIG. 1.
Figure 3:
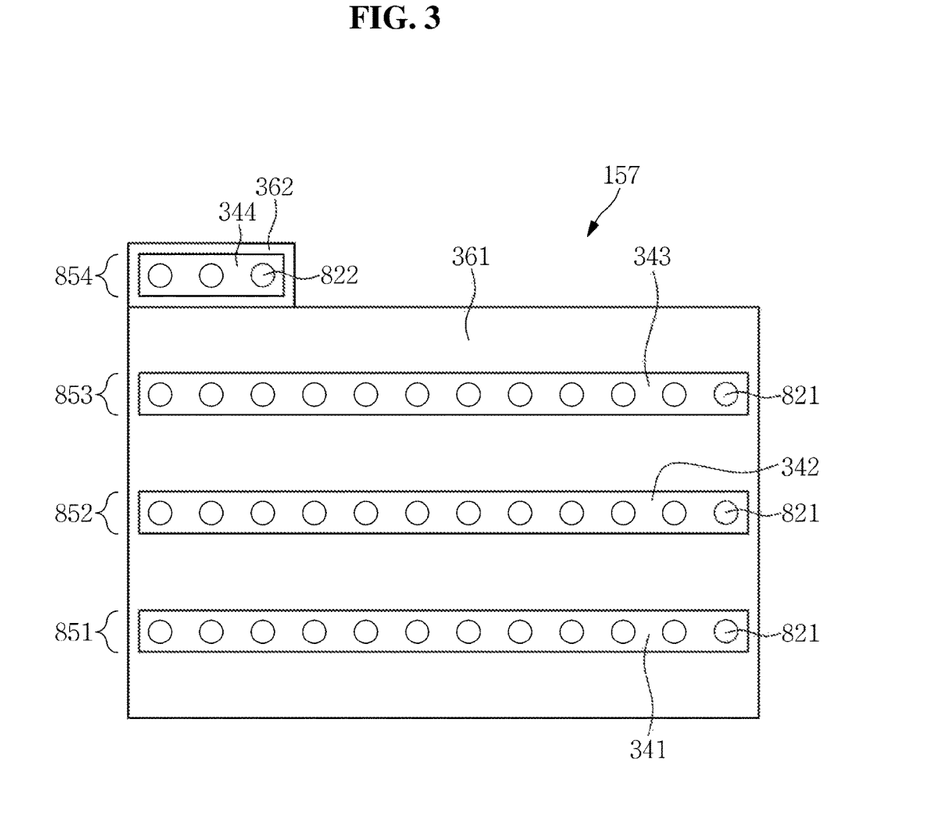
FIG. 3 is a view illustrating an exemplary embodiment of a backlight unit illustrated in FIG. 1.

FIG. 1 is a block diagram illustrating the display device 100 according to an exemplary embodiment. FIG. 2 is a detailed configuration view illustrating a first display panel 131 illustrated in FIG. 1. FIG. 3 is a view illustrating an exemplary embodiment of a backlight unit illustrated in FIG. 1. Depending on embodiments, certain elements may be removed from or additional elements may be added to the display device 100 illustrated in FIG. 1. Furthermore, two or more elements may be combined into a single element, or a single element may be realized as multiple elements. This also applies to the remaining disclosed embodiments.

The display device 100, as illustrated in FIG. 1, includes a display panel, a backlight unit 150, a timing controller 101, a first gate driver 141, a second gate driver 142, a first data driver 111, a second data driver 112, and a first direct current ("DC")-DC converting unit (or first DC-DC converter) 177.

The display panel 130 includes the first display panel 131 and a second display panel 132.

The first and second display panels 131 and 132 can be integrally formed. Alternatively, the first and second display panels 131 and 132 can be separated into individual panels.

An area of the first display panel 131 is larger than an area of the second display panel 132. The area of a display area included in the first display panel 131 is larger than an area of a display area included in the second display panel 132.

The first display panel 131 is a main display panel displaying a main image. As used herein, the main image refers to a general image including various moving images and static images. Although not illustrated, the first display panel 131 includes a liquid crystal layer, and a lower substrate and an upper substrate facing each other with the liquid crystal layer interposed therebetween.

As illustrated in FIG. 2, on the lower substrate of the first display panel 131, a plurality of gate lines GL1 to GLi, a plurality of data lines DL1 to DLj intersecting the gate lines GL1 to GLi, and thin film transistors ("TFT") connected to the gate lines GL1 to GLi and the data lines DL1 to DLj can be disposed.

Although not illustrated, on the upper substrate of the first display panel 131, a black matrix, a plurality of color filters, and a common electrode are disposed. The black matrix is disposed on a portion of the upper substrate, aside from a portion corresponding to pixel areas. Color filters are disposed in the pixel area. The color filters are classified into a red color filter, a green color filter, and a blue color filter.

Pixels R, G, and B, as illustrated in FIG. 2, are arranged in a matrix form. The pixels R, G, and B are classified into red pixels R disposed corresponding to the red color filter, green pixels G disposed corresponding to the green color filter, and blue pixels B disposed corresponding to the blue color filter. In this regard, the red pixel R, the green pixel G, and the blue pixel B that are adjacently disposed in a horizontal direction can form a unit pixel for displaying a unit image.

There are "j" number of pixels arranged along an $n^{th}$ (n is one selected from 1 to i) horizontal line (hereinafter, "$n^{th}$ horizontal line pixels"), and the $n^{th}$ horizontal line pixels are connected to the first to the $j^{th}$ data lines DL1 to DLj, respectively. Further, the $n^{th}$ horizontal line pixels are connected to the $n^{th}$ gate line together. Accordingly, the $n^{th}$ horizontal line pixels receive an $n^{th}$ gate signal as a common signal. That is, "j" number of pixels arranged in the same horizontal line can receive the same gate signal, while pixels arranged in different horizontal lines can receive different gate signals, respectively. For example, each of the red pixel R, the green pixel G, and the blue pixel B on the first horizontal line HL1 receives a first gate signal, while the red pixel R, the green pixel G, and the blue pixel B on the second horizontal line HL2 receive a second gate signal that is output at a timing different from a timing of the first gate signal.

Each of the red pixel R, the green pixel G, and the blue pixel includes a TFT, a liquid crystal capacitor Clc, and a storage capacitor Cst.

The TFT is turned on based on a gate signal applied from the gate line GLi. The turned-on TFT supplies an analog image data signal applied from the data line DLj to the liquid crystal capacitor Clc and the storage capacitor Cst.

The liquid crystal capacitor Clc includes a pixel electrode and a common electrode opposing each other.

The storage capacitor Cst includes a pixel electrode and an opposing electrode opposing each other. Herein, the opposing electrode can be a previous gate line or a common line that transmits a common voltage.

Meanwhile, the TFT, from among elements constituting the red pixel R, the green pixel G, and the blue pixel B, is covered by a black matrix.

The second display panel 132 is an auxiliary display panel configured to display an auxiliary image. As used herein, the auxiliary image, for example, includes an anniversary alarm, weather information, sport information, shopping information, and the like. Although not illustrated, the second display panel 132 includes a liquid crystal layer, and a lower substrate and an upper substrate facing each other with the liquid crystal layer interposed therebetween.

The second display panel 132 is disposed adjacent to an edge portion of one side of the first display panel 131. For example, in a case where a virtual line intersecting a center portion of the first display panel 131 and being parallel to one side of the first display panel 131 is defined as a center line of the first display panel 131, the second display panel 132 is disposed between an extension of the one side of the first display panel 131 and an extension of the center line of the first display panel 131.

The second display panel 132 can have a configuration that is the same as that of the aforementioned first display panel 131. That is, a plurality of gate lines, a plurality of data lines, a plurality of pixel electrodes, and a plurality of thin film transistors are disposed on the lower substrate of the second display panel 132, and a black matrix, a color filter, and a common electrode can be disposed on the upper substrate of the second display panel 132.

The timing controller 101 is configured to receive a vertical synchronization signal Vsync, a horizontal synchronization signal Hsync, an image data signal DATA, and a clock signal DCLK output from a graphic controller provided in a system. An interface circuit (not illustrated) is provided between the timing controller 101 and the system, and the aforementioned signals output from the system are input to the timing controller 101 via the interface circuit. The interface circuit can be embedded in the timing controller 101.

Although not illustrated, the interface circuit includes a low voltage differential signaling ("LVDS") receiver. The interface circuit lowers voltage levels of the vertical synchronization signal Vsync, the horizontal synchronization signal Hsync, the image data signal DATA, and the clock signal DCLK output from the system, but increases frequencies of the signals.

Meanwhile, due to a high-frequency component of the signal input to the timing controller 101 from the interface circuit, electromagnetic interference ("EMI") can be caused therebetween. In order to prevent EMI, an EMI filter (not illustrated) can further be provided between the interface circuit and the timing controller 101.

The timing controller 101 generates a first gate control signal GCS1 for controlling the first gate driver 141, a second gate control signal GCS2 for controlling the second gate driver 142, a first data control signal DCS1 for controlling the first data driver 111, and a second data control signal DCS2 for controlling the second data driver 112 based on the vertical synchronization signal Vsync, the horizontal synchronization signal Hsync, and the reference clock signal DCLK.

The first gate control signal GCS1 includes a gate start pulse, a gate shift clock, a gate output enable signal, and the like.

The second gate control signal GCS2 includes signals the same as those included in the first gate control signal GCS1.

The first data control signal DCS1 includes a source start pulse, a source shift clock, a source output enable signal, a polarity signal, and the like.

The second data control signal DCS2 includes signals the same as those included in the first data control signal DCS1.

In addition, the timing controller 101 rearranges the image data signals DATA input via the system to generate first image data signals DATA1 and second image data signals DATA2. The timing controller 101 then supplies the first image data signals DATA1 to the first data driver 111 and supplies the second image data signals DATA2 to the second data driver 112. The first image data signals DATA1 are signals corresponding to the aforementioned main image, and the second image data signals DATA2 are signals corresponding to the aforementioned auxiliary image.

The timing controller 101 is operated by a first driving power VCC1 output from a power unit 125 provided in the system. For example, the first driving power VCC1 is used as a power voltage of a phase lock loop (PLL) circuit embedded in the timing controller 101. The phase lock loop circuit compares the clock signal DCLK input to the timing controller 101 with a reference frequency generated by an oscillator. In a case where it is verified from the comparison that there is a difference therebetween, the phase lock loop circuit adjusts the frequency of the clock signal DCLK by the difference to generate a sampling clock signal. The sampling clock signal is a signal used to perform sampling of the first image data signal DATA1 and the second image data signal DATA2.

The power unit 125 can include a DC power supply, for example, a switching mode power supply. The power unit 125 can be built in the display device 100 rather than in the system.

The first DC-DC converting unit 171 increases or decreases the first driving power VCC1 input through the power unit 125 so as to generate voltages required for the display panel 130. To this end, the first DC-DC converting unit 171 can include, for example, an output switching element to switch an output voltage of an output terminal thereof and a pulse width modulator PWM to increase or decrease the output voltage by adjusting a duty ratio or a frequency of a control signal that is applied to a control terminal of the output switching element. Herein, a pulse frequency modulator PFM, in lieu of the pulse width modulator PWM, can be included in the first DC-DC converting unit 171.

The pulse width modulator PWM increases the duty ratio of the aforementioned control signal to increase the output voltage of the first DC-DC converting unit 171, or decreases the duty ratio of the aforementioned control signal to decrease the output voltage of the first DC-DC converting unit 171.

The pulse frequency modulator PFM increases the frequency of the aforementioned control signal to increase the output voltage of the first DC-DC converting unit 171, or decreases the frequency of the aforementioned control signal to decrease the output voltage of the first DC-DC converting unit 171. The output voltage of the first DC-DC converting unit 171 can include a reference voltage VDD of about 6 V or more, a gamma reference voltage GMA1-10 having a level lower than level 10, a common voltage in a range from about 2.5 V to about 3.3 V, a gate high voltage of about 15 V or more, and a gate low voltage of about −4 V or lower.

The gamma reference voltage GMA1-10 is a voltage generated by voltage division of the reference voltage VDD. The reference voltage VDD and the gamma reference voltage GMA1-10 are analog voltages and are provided to the first data driver 111 and the second data driver 112. A common voltage Vcom is applied to a common electrode of the first display panel 131 via the first data driver 111, and is applied to a common electrode of the second display panel 132 via the second data driver 112. A gate high voltage is a high logic voltage of the gate signal that is set to be a threshold voltage of the TFT or more, and a gate low voltage is a low logic voltage of the gate signal that is set to be an off-voltage of the TFT. The gate high voltage and the gate low voltage are applied to the first gate driver 141 and the second gate driver 142.

The first gate driver 141 generates gate signals according to the first gate control signal GCS1 applied from the timing controller 101 and sequentially applies the gate signals to the gate lines GL1 to GLi. The first gate driver 141, for example, can include a shift register that shifts the gate start pulse according to the gate shift clock so as to generate gate signals. The shift register can include a plurality of switching elements. The switching elements can be formed in a non-display area of the lower substrate in the same process as in the TFT of the first display panel 131.

The second gate driver 142 generates gate signals according to the second gate control signal GCS2 applied from the timing controller 101 and sequentially applies the gate signals to the gate lines GL1 to GLx. The second gate driver 142, for example, includes a shift register that shifts the gate start pulse according to the gate shift clock so as to generate gate signals. The shift register can include a plurality of switching elements. The switching elements can be formed in a non-display area of the lower substrate in the same process as in the TFT of the second display panel 132.

The first data driver 111 receives the first image data signals DATA1 and the first data control signal DCS1 from the timing controller 101. The first data driver 111 samples the first image data signals DATA1 according to the first data control signal DCS1, latches the sampled image data signals corresponding to one horizontal line each horizontal period, and applies analog data voltages corresponding to the latched image data signals to the data lines DL1 to DLj of the first display panel 131. That is, the first data driver 111 converts the first image data signals DATA1 applied from the timing controller 101 into analog data voltages using the gamma reference voltages GMA1-10 input from the first DC-DC converting unit 171 and applies the converted analog data voltages to the data lines DL1 to DLj of the first display panel 131.

The second data driver 112 receives the second image data signals DATA2 and the second data control signal DCS2 from the timing controller 101. The second data driver 112 samples the second image data signals DATA2 according to the second data control signal DCS2, latches the sampled image data signals corresponding to one horizontal line each horizontal period, and applies analog data voltages corresponding to the latched image data signals to the data lines DL1 to DLy of the second display panel 132. That is, the second data driver 112 converts the second image data signals DATA2 applied from the timing controller 101 into analog data voltages using the gamma reference voltages GMA1-10 input from the first DC-DC converting unit 171 and applies the converted analog data voltages to the data lines DL1 to DLy of the second display panel 132.

The backlight unit 150 provides light to the first display panel 131 and the second display panel 132. The backlight unit 150 includes a backlight 157 that emits light and a backlight control unit 158 that controls the backlight 157.

The backlight 157, as illustrated in FIG. 3, includes a first backlight 361 and a second backlight 362.

The first backlight 361 is disposed to correspond to the first display panel 131. In such an embodiment, the first backlight 361 faces the lower substrate of the first display panel 131. Accordingly, the lower substrate of the first display panel 131 is disposed between the upper substrate of the first display panel 131 and the first backlight 361.

The first backlight 361 includes a plurality of light sources 821 (hereinafter, "primary light sources").

The primary light sources 821 can be divided into a plurality of light source strings; for example, the primary light sources 821 can be divided into first, second, and third light source strings 851, 852, and 853. Each of the first, second, and third light source strings 851, 852, and 853 can include nine primary light sources 821 as illustrated in FIG. 3. However, exemplary embodiments are not limited thereto, and the number of primary light sources 821 provided in each of the first, second, and third light source strings 851, 852, and 853 can vary.

Each of the first, second, and third light source strings 851, 852, and 853 can include the same number of light sources, as illustrated in FIG. 3.

The primary light sources 821 included in a single light source string can be disposed on a single printed circuit board. For example, as illustrated in FIG. 3, nine primary light sources 821 included in the first light source string 851 are mounted on a first printed circuit board 341, nine primary light sources 821 included in the second light source string 852 are mounted on a second printed circuit board 342, and nine primary light sources 821 included in the third light source string 853 are mounted on a third printed circuit board 343.

The second backlight 362 is disposed to correspond to the second display panel 132. In such an embodiment, the second backlight 362 faces the lower substrate of the second display panel 132. Accordingly, the lower substrate of the second display panel 132 is disposed between the upper substrate of the second display panel 132 and the second backlight 362.

The second backlight 362 includes a plurality of light sources 822 ("hereinafter, auxiliary light sources").

The auxiliary light sources 822 constitute one light source string 854 (hereinafter, "fourth light source string"). The fourth light source string 854, as illustrated in FIG. 3, includes three auxiliary light sources 822. However, the number of auxiliary light sources 822 is merely described as an example, and the number of auxiliary light sources 822 disposed in the fourth light source string 854 can vary. However, the number of auxiliary light sources 822 in the fourth light source string 854 is less than the number of primary light sources 821 in a $k^{th}$ light source string (k is one selected from 1, 2, and 3). That is, the number of auxiliary light sources 822 connected to one another in series is less than the number of primary light sources 821 connected to one another in series.

The auxiliary light sources 822 included in the fourth light source string 854 can be disposed on a single printed circuit board 344.

Meanwhile, the auxiliary light sources 822 can be divided into a plurality of light source strings.

Figure 4:
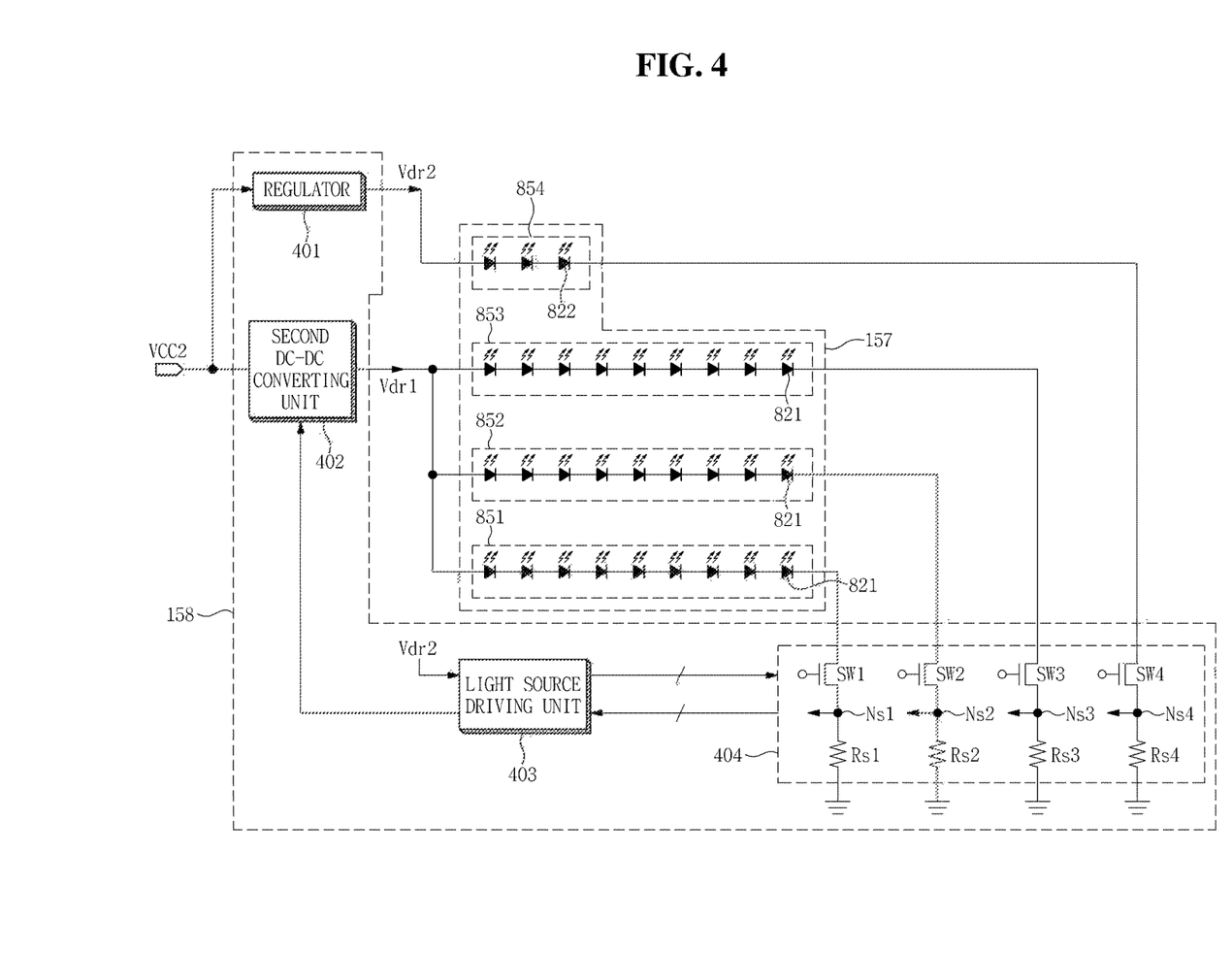
FIG. 4 is a view illustrating an equivalent circuit diagram of a light source string illustrated in FIG. 3 and a configuration of a backlight control unit illustrated in FIG. 1.

FIG. 4 is a view illustrating an equivalent circuit diagram of the light source strings (e.g., the first to fourth light source strings 851, 852, 853, and 854) illustrated in FIG. 3 and a configuration of the backlight control unit 158 illustrated in FIG. 1.

The primary light sources 821 respectively included in the first, second, and third light source strings 851, 852, and 853 and the auxiliary light source 822 included in the fourth light source string 854, as illustrated in FIG. 4, can each be a light-emitting diode ("LED").

The backlight control unit 158 includes a second DC-DC converting unit 402, a static current control unit 404, a light source driving unit 403, and a regulator 401.

The second DC-DC converting unit 402 receives a second driving power VCC2 output from a power unit provided in a system to generate a first light source driving voltage Vdr1. The first light source driving voltage Vdr1 can be greater than the second driving power VCC2. For example, the second driving power VCC2 can be about 24 V, and the first light source driving voltage Vdr1 can be about 34 V. To this end, the second DC-DC converting unit 402 can raise the level of the second driving power VCC2 to generate the first light source driving voltage Vdr1.

The first light source driving voltage Vdr1 applied from the second DC-DC converting unit 402 can be applied to the first, second, and third light source strings 851, 852, and 853 as a common voltage. That is, the first light source driving voltage Vdr1 is applied to an anode electrode of one outermost primary light source of the primary light sources 821 provided in the first light source string 851, an anode electrode of one outermost primary light source of the primary light sources 821 provided in the second light source string 852, and an anode electrode of one outermost primary light source of the primary light sources 821 provided in the third light source string 853.

The regulator 401 receives the second driving power VCC2 output from the power unit of the system to generate a second light source driving voltage Vdr2. The second light source driving voltage Vdr2 can be less than the second driving power VCC2. For example, the second driving power VCC2 can be about 24 V, and the second light source driving voltage Vdr2 can be about 12 V. To this end, the regulator 401 lowers the level of the second driving power VCC2 to generate the second light source driving voltage Vdr2. The second light source driving voltage Vdr2 can be lower than the first light source driving voltage Vdr1. The regulator 401 can be a linear regulator or a low dropout ("LDO") regulator.

The static current control unit 404 detects light source driving currents flowing through respective ones of the first to fourth light source strings 851, 852, 853, and 854, respectively, generates current-detecting voltages corresponding to the respective ones of the light source driving currents, and applies the generated current-detecting voltages to the light source driving unit 403. The light source driving unit 403 generates current control signals corresponding to the respective ones of the first to fourth light source strings 851, 852, 853, and 854 based on the current-detecting voltages, respectively, and the static current control unit 404 controls levels of the light source driving currents flowing through the respective ones of the first to fourth light source strings 851, 852, 853, and 854 based on the current control signals, respectively. To this end, the static current control unit 404, as illustrated in FIG. 4, can include first to fourth static current switching elements SW1, SW2, SW3, and SW4, and first to fourth detecting resistors Rs1, Rs2, Rs3, and Rs4.

The first static current switching element SW1 is controlled by a first switch control signal applied from the light source driving unit 403, and is connected between a cathode electrode of another outermost primary light source of the primary light sources 821 provided in the first light source string 851 and a first detecting node Ns1.

The first detecting resistor Rs1 is connected between the first detecting node Ns1 and ground.

The second static current switching element SW2 is controlled based on a second switch control signal applied from the light source driving unit 403, and is connected between a cathode electrode of another outermost primary light source of the primary light sources 821 provided in the second light source string 852 and a second detecting node Ns2.

The second detecting resistor Rs2 is connected between the second detecting node Ns2 and ground.

The third static current switching element SW3 is controlled based on a third switch control signal applied from the light source driving unit 403, and is connected between a cathode electrode of another outermost primary light source of the primary light sources 821 provided in the third light source string 853 and a third detecting node Ns3.

The third detecting resistor Rs3 is connected between the third detecting node Ns3 and ground.

The fourth static current switching element SW4 is controlled based on a fourth switch control signal applied from the light source driving unit 403, and is connected between a cathode electrode of another outermost auxiliary light source of the auxiliary light sources 822 provided in the fourth light source string 854 and a fourth detecting node Ns4.

The fourth detecting resistor Rs4 is connected between the fourth detecting node Ns4 and ground.

As such, the second light source driving voltage Vdr2 which has a relatively low level is applied to the fourth light source string 854 which has a less load that those of the first, second, and third light source strings 851, 852, and 853, and thus power consumed by the fourth static current switching element SW4 can be reduced. For example, when it is assumed that voltage drops across the primary light source 821 and the auxiliary light source 822 are about 3.65 V each, being the same as each other, a voltage drop across the first light source string 851 is about 32.85 V (about 3.65 V*9). In such an embodiment, voltage drops across the second light source string 852 and the third light source string 853 are also about 33 V each. As used herein, as the first light source driving voltage Vdr1 is about 34 V, a voltage drop across the first static current switching element SW1 and the first detecting resistor Rs1, a voltage drop across the second static current switching element SW2 and the second detecting resistor Rs2, and a voltage drop across the third static current switching element SW3 and the third detecting resistor Rs3 are about 1.15 V (about 34 V to about 32.85 V) each, being the same. Meanwhile, a voltage drop across the fourth light source string 854 is about 10.95 V (about 3.65 V*3). In addition, as the second light source driving voltage Vdr2 is about 12 V, a voltage drop across the fourth static current switching element SW4 and the fourth detecting resistor Rs4 is about 1.05 V (about 12 V to about 10.95 V).

In such an embodiment, when it is assumed that the first to fourth static current switching elements SW1, SW2, SW3, and SW4 are turned on so that a light source driving current of 0.1 A flows through the first to fourth light source strings 851, 852, 853, and 854 and voltages across opposite ends of the first to fourth detecting resistors Rs1, Rs2, Rs3, and Rs4 are 0.4 V each, source-drain voltages of the first, second, and third static current switching elements SW1, SW2, and SW3 are about 0.75 V (about 1.15 V to about 0.4 V) each, and a source-drain voltage of the fourth static current switching element SW4 is about 0.65 V (about 1.05 V to about 0.4 V). In such an embodiment, a power consumption of the fourth static current switching element SW4 is about 0.065 W (about 0.65 V*about 0.1 A). As such, the power consumed by the fourth static current switching element SW4 is significantly small. This is because a relative low voltage, that is, the second light source driving voltage Vdr2, is applied to the fourth light source string 854 which has a relatively less load.

The second light source driving voltage Vdr2 can be applied externally, but can be generated by, for example, the regulator 401. That is, the regulator 401 outputs a voltage (hereinafter, "output voltage") of 12 V as a voltage to drive the light source driving unit 403, and the output voltage can be used to drive the light source driving unit 403 and the fourth light source string 854. For example, while being used as a driving voltage to drive the light source driving unit 403, the output voltage of the regulator 401 can also be used as a driving voltage, that is, the second light source driving voltage Vdr2, to drive the fourth light source string 854. As such, the fourth light source string 854 can operate at a relatively low voltage, that is, the output voltage of the regulator 401, without an additional element, and thus the power consumption of the static current switching element can be reduced with a relatively low-cost structure.

In a case where a plurality of output voltages each having different levels are output from the regulator 401, one of the output voltages can be used as the second light source driving voltage Vdr2, and another thereof can be used as a driving voltage of the light source driving unit 403.

The light source driving unit 403 generates current control signals corresponding to the respective ones of the first to fourth light source strings 851, 852, 853, and 854 based on current-detecting voltages detected by the first to fourth detecting resistors Rs1, Rs2, Rs3, and Rs4, respectively. In addition, the light source driving unit 403 can control the second DC-DC converting unit 402 and the static current control unit 404 based on a dimming signal externally applied thereto.

Figure 5:
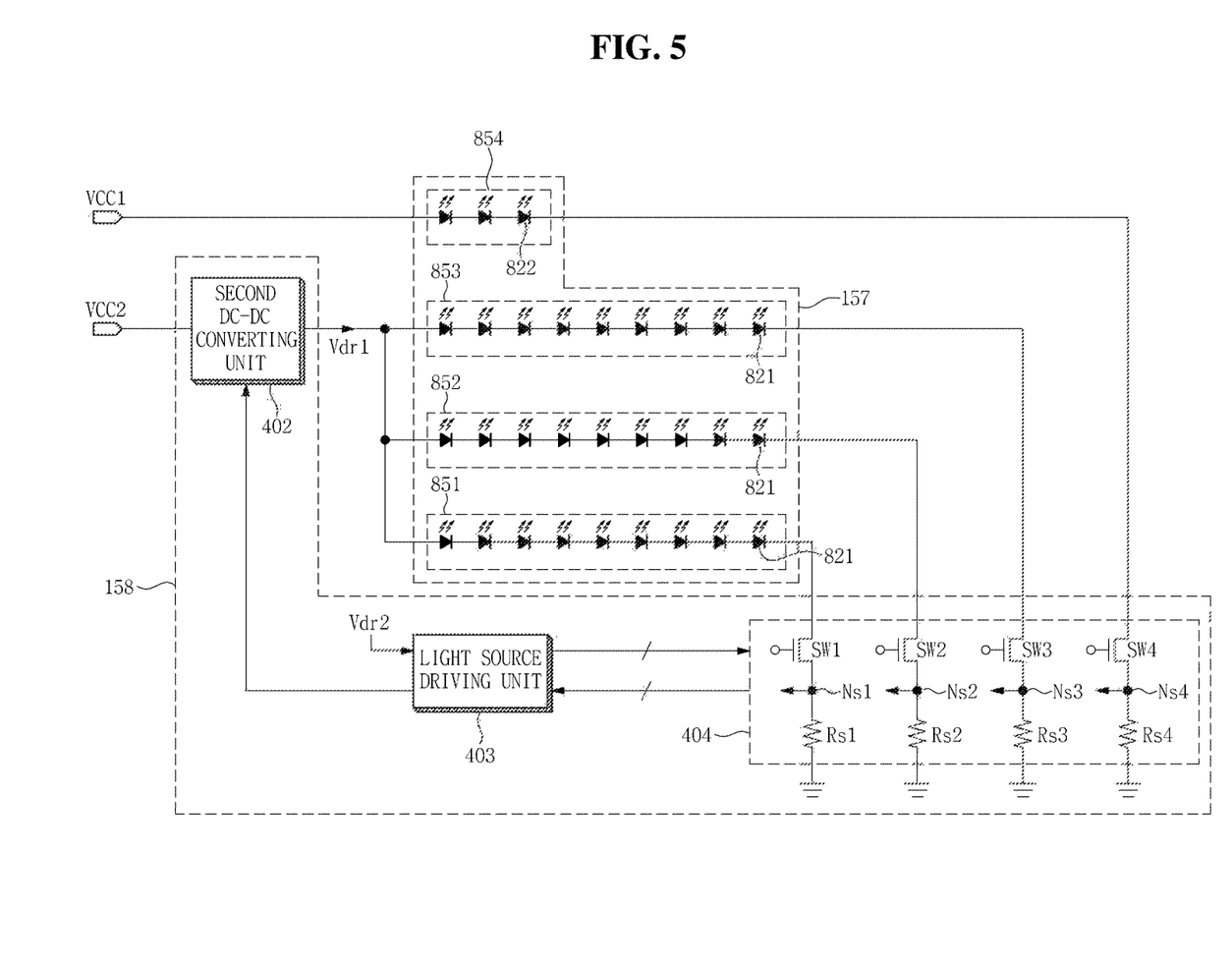
FIG. 5 is another view illustrating an equivalent circuit diagram of the light source string illustrated in FIG. 3 and a configuration of the backlight control unit illustrated in FIG. 1.

FIG. 5 is another view illustrating an equivalent circuit diagram of the light source strings (e.g., the first to fourth light source strings 851, 852, 853, and 854) illustrated in FIG. 3 and a configuration of the backlight control unit 158 illustrated in FIG. 1.

Primary light sources 821 included in the first, second, and third light source strings 851, 852, and 853 and an auxiliary light source 822 included in the fourth light source string 854 can each be an LED. The first, second, and third light source strings 851, 852, and 853 of FIG. 5 are the same as those of FIG. 4, and thus descriptions with respect to the first, second, and third light source strings 851, 852, and 853 will make reference to FIG. 4 and the related descriptions.

The backlight control unit 158 illustrated in FIG. 5 includes a second DC-DC converting unit 402, a static current control unit 404, and a light source driving unit 403. The second DC-DC converting unit 402, the static current control unit 404, and the light source driving unit 403 of the backlight control unit 158 of FIG. 5 are the same as those of FIG. 4, and thus the second DC-DC converting unit 402, the static current control unit 404, and the light source driving unit 403 of FIG. 5 will make reference to FIG. 4 and the related descriptions.

As illustrated in FIG. 5, the fourth light source string 854 receives, instead of an output voltage of a regulator 401, a first driving power VCC1 of a power unit 125. That is, the fourth light source string 854 can receive, instead of the output voltage, the first driving power VCC1 as a second light source driving voltage Vdr2. For example, the first driving power VCC1 can be a DC voltage of about 12 V.

As such, as the first driving power VCC1 is applied to the fourth light source string 854 that has a less load than those of the first, second, and third light source strings 851, 852, and 853, power consumed by the fourth static current switching element SW4 can be reduced.

With reference to FIG. 5, while being used as a driving voltage to drive the display panel 130, the first driving power VCC1 applied from the power unit 125 can also be used as a driving voltage (a light source driving voltage) to drive the fourth light source string 854. As such, the fourth light source string 854 can operate at a relatively low voltage, that is, the first driving power VCC1, without an additional element, and thus the power consumption of the fourth static current switching element SW4 can be reduced with a relatively low-cost structure.

The backlight control unit 158 of FIG. 5 can further include the regulator 401 illustrated in FIG. 4, and in such an embodiment, an output voltage of the regulator 401 of FIG. 5 can only be applied to the light source driving unit 403. For example, the output voltage of the regulator 401 of FIG. is not applied to the fourth light source string 854.

The first driving power VCC1 applied to the fourth light source string 854 can vary based on the number of auxiliary light sources 822 of the fourth light source string 854. For example, in a case where the number of auxiliary light sources 822 of the fourth light source string 854 is greater than the number of the primary light sources 821 of the $k^{th}$ light source string, the first driving power VCC1 can be higher than the second driving power VCC2.

Figure 6:
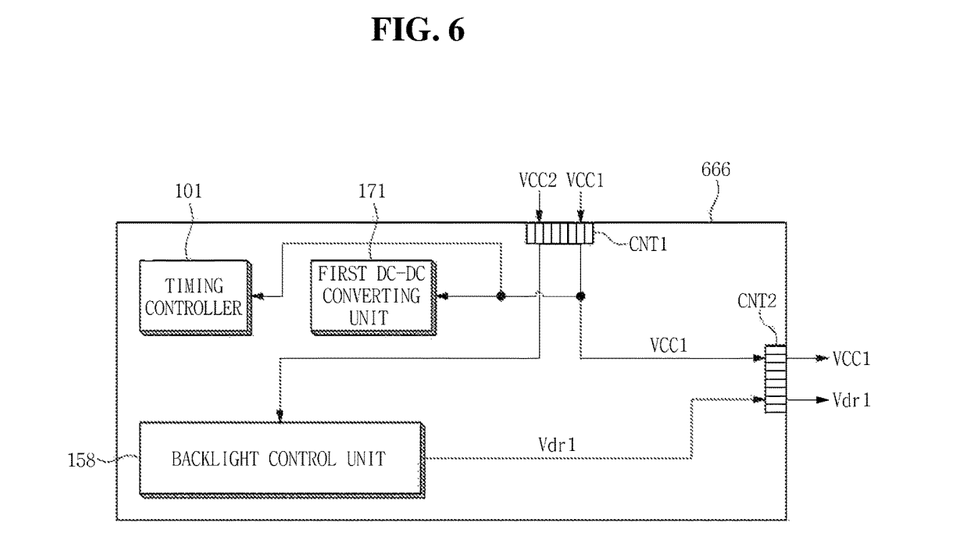
FIG. 6 is a view illustrating a circuit board including the backlight control unit illustrated in FIG. 5 and a timing controller and a first direct current ("DC")-DC converting unit illustrated in FIG. 1.

FIG. 6 is a view illustrating a circuit board 666 including the backlight control unit 158 of FIG. 5 and the timing controller 101 and the first direct current ("DC")-DC converting unit 171 of FIG. 1.

As illustrated in FIG. 6, the timing controller 101, the first DC-DC converting unit 171, and the backlight control unit 158 can be disposed on the single circuit board 666.

The circuit board 666 includes an input connector CNT1 and an output connector CNT2.

The first driving power VCC1 and the second driving power VCC2 generated from the power unit 125 are applied to the circuit board 666 through the input connector CNT1. The first driving power VCC1 input to the circuit board 666 is applied to the timing controller 101, the first DC-DC converting unit 171, and the output connector CNT2. The second driving power VCC2 input to the circuit board 666 is applied to the backlight control unit 158.

In addition, the first driving power VCC1 input to the circuit board 666 is input to the fourth light source string 854 through the output connector CNT2. A first light source driving voltage Vdr1 generated from the backlight control unit 158 is input to the first, second, and third light source strings 851, 852, and 853.

In such an embodiment, the first driving power VCC1 output from the power unit 125 can be input to the input connector CNT1 and the fourth light source string 854. That is, the first driving power VCC1 output from the power unit 125 can be directly applied to the fourth light source string 854 without being transmitted through the circuit board 666.

According to at least one of the disclosed embodiments, a light-source driving voltage applied to an auxiliary light source of an auxiliary display panel is lower than a voltage applied to a primary light source of a primary display panel such that power consumption and an amount of heat generation of a static current switching element connected to the auxiliary light source are significantly reduced.

Also, the auxiliary light source can operate at a relatively low voltage only with an output voltage of a regulator or a driving power of a power unit without an additional element, such that the power consumption of the static current switching element can be reduced with a relatively low-cost structure.

From the foregoing, it will be appreciated that the inventive technology has been described herein for purposes of illustration, and that various modifications can be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the scope of the claims.

What is claimed is:

1. A display device comprising:
   a display panel comprising a first display panel and a second display panel;
   a first light source unit including a plurality of first light sources facing the first display panel;
   a second light source unit including a plurality of second light sources facing the second display panel;
   a direct current (DC)-DC converter configured to receive a driving power and generate a first light source driving voltage configured to drive the first light source unit; and
   a regulator configured to receive the driving power and generate a second light source driving voltage configured to drive the second light source unit,
   wherein the number of the first light sources is different from the number of the second light sources.

2. The display device of claim 1, wherein the number of the second light sources is less than the number of the first light sources.

3. The display device of claim 2, wherein the number of the second light sources connected to one another in series is less than the number of the first light sources connected to one another in series.

4. The display device of claim 1, wherein the second light source driving voltage is lower than the first light source driving voltage.

5. The display device of claim 1, wherein a voltage between ends of the second light source unit is lower than a voltage between ends of the first light source unit.

6. The display device of claim 1, wherein the regulator includes a linear regulator or a low-dropout (LDO) regulator.

7. The display device of claim 1, further comprising:
   a light source driving unit configured to generate a plurality of current control signals to control the first and second light source units;
   a second detecting node connected to the light source driving unit;
   a second static current switching element connected between the second light source unit and the second detecting node, wherein the light source driving unit is configured to control the second static current switching element; and
   a second detecting resistor connected between the second detecting node and a ground.

8. The display device of claim 1, further comprising a power unit configured to output the driving power.

9. The display device of claim 1, further comprising a light source driving unit configured to receive an output voltage from the regulator and control the DC-DC converter.

10. The display device of claim 9, wherein the output voltage and the second light source driving voltage are the same.

11. A display device comprising:
    a display panel comprising a first display panel and a second display panel;
    a first light source unit included in a first backlight disposed to correspond to the first display panel;
    a second light source unit included in a second backlight disposed to correspond to the second display panel;
    a direct current (DC)-DC converter configured to receive a driving power and generate a first light source driving voltage configured to drive the first light source unit;
    a regulator configured to receive the driving power and generate a second light source driving voltage configured to drive the second light source unit;
    a light source driving unit configured to generate a plurality of current control signals to control the first and second light source units;
    a first detecting node connected to the light source driving unit;
    a first static current switching element connected between the first light source unit and the first detecting node, wherein the light source driving unit is configured to control the first static current switching element; and
    a first detecting resistor connected between the first detecting node and a ground.

12. A display device comprising:
a display panel comprising a first display panel and a second display panel;
a first light source unit included in a first backlight disposed to correspond to the first display panel;
a second light source unit included in a second backlight disposed to correspond to the second display panel;
a first DC-DC converter configured to receive a first driving power and generate a panel driving voltage configured to drive the display panel; and
a second DC-DC converter configured to receive a second driving power and generate a first light source driving voltage configured to drive the first light source unit,
wherein the second light source unit is configured to receive the first driving power as a second light source driving voltage to drive the second light source unit.

13. The display device of claim 12, wherein the first light source unit includes a plurality of first light sources facing the first display panel, the second light source unit includes a plurality of second light sources facing the second display panel, and the number of the first light sources is different from the number of the second light sources.

14. The display device of claim 13, wherein the number of the second light sources is less than the number of the first light sources.

15. The display device of claim 14, wherein the number of the second light sources connected to one another in series is less than the number of the first light sources connected to one another in series.

16. The display device of claim 12, wherein the first driving power is lower than the second driving power.

17. The display device of claim 12, wherein a voltage between ends of the second light source unit is lower than a voltage between ends of the first light source unit.

18. The display device of claim 12, further comprising a circuit board configured to receive the second driving power to transfer the second driving power to the second light source unit.

19. The display device of claim 12, further comprising:
a light source driving unit configured to generate a plurality of current control signals to control the first and second light source units;
a second detecting node connected to the light source driving unit;
a second static current switching element connected between the second light source unit and the second detecting node, wherein the light source driving unit is configured to control the second static current switching element; and
a second detecting resistor connected between the second detecting node and a ground.

20. The display device of claim 12, further comprising a power unit configured to generate the first and second driving powers.

21. A display device comprising:
a display panel comprising a first display panel and a second display panel;
a first light source unit included in a first backlight disposed to correspond to the first display panel;
a second light source unit included in a first backlight disposed to correspond to the second display panel;
a first DC-DC converter configured to receive a first driving power and generate a panel driving voltage configured to drive the display panel;
a second DC-DC converter configured to receive a second driving power and generate a first light source driving voltage configured to drive the first light source unit;
wherein the second light source unit is configured to receive the first driving power as a second light source driving voltage to drive the second light source unit;
a light source driving unit configured to generate a plurality of current control signals to control the first and second light source units;
a first detecting node connected to the light source driving unit;
a first static current switching element connected between the first light source unit and the first detecting node, wherein the light source driving unit is configured to control the first static current switching element; and
a first detecting resistor connected between the first detecting node and a ground.

* * * * *